United States Patent
Sudou et al.

(10) Patent No.: US 8,280,573 B2
(45) Date of Patent: Oct. 2, 2012

(54) GUIDED CONTROL DEVICE FOR UNMANNED VEHICLE

(75) Inventors: Tsugio Sudou, Kanagawa (JP); Akiharu Nishijima, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 1095 days.

(21) Appl. No.: 11/890,383

(22) Filed: Aug. 6, 2007

(65) Prior Publication Data
US 2009/0299562 A1 Dec. 3, 2009

(30) Foreign Application Priority Data
Aug. 10, 2006 (JP) ................................. 2006-218232

(51) Int. Cl.
G01C 22/00 (2006.01)
G05D 1/00 (2006.01)

(52) U.S. Cl. .............. 701/25; 701/23; 701/93; 701/117; 701/121; 340/989

(58) Field of Classification Search ................ 701/93, 701/2, 23–26, 116–123, 408, 466, 517; 180/170; 340/438, 988, 989, 995.25, 995.28, 996; 342/70
See application file for complete search history.

(56) References Cited

U.S. PATENT DOCUMENTS

| | | | | |
|---|---|---|---|---|
| 3,941,201 | A * | 3/1976 | Hermann et al. | 180/168 |
| 6,539,294 | B1 * | 3/2003 | Kageyama | 701/23 |
| 6,577,334 | B1 * | 6/2003 | Kawai et al. | 348/148 |
| 6,725,145 | B1 * | 4/2004 | Takahashi | 701/70 |
| 6,941,201 | B2 * | 9/2005 | Sudou | 701/23 |
| 7,504,987 | B2 * | 3/2009 | Oka et al. | 342/70 |
| 7,603,235 | B2 * | 10/2009 | Makela et al. | 701/301 |
| 2004/0061626 | A1 * | 4/2004 | Kubota | 340/901 |
| 2006/0212219 | A1 * | 9/2006 | Okada et al. | 701/211 |
| 2006/0282218 | A1 * | 12/2006 | Urai et al. | 701/301 |
| 2007/0032943 | A1 * | 2/2007 | Okabe | 701/200 |
| 2008/0270027 | A1 * | 10/2008 | Stecko et al. | 701/214 |

FOREIGN PATENT DOCUMENTS

| | | |
|---|---|---|
| JP | 2821909 | 11/1998 |
| JP | 2004-157934 | 6/2004 |
| JP | 2005-164470 | 6/2005 |

OTHER PUBLICATIONS

Office Action dated Nov. 8, 2011 for related Japanese Patent Application No. 2007-155142.

* cited by examiner

*Primary Examiner* — Hussein Elchanti
*Assistant Examiner* — Rami Khatib
(74) *Attorney, Agent, or Firm* — Husch Blackwell LLP

(57) ABSTRACT

Guiding speed is increased while an unmanned vehicle is prevented from straying from a travel passage width, to improve the work efficiency. Target speed of the unmanned vehicle increases as a distance between a current position of the unmanned vehicle and a guidable borderline increases, and the target speed of the unmanned vehicle decreases as the distance between the current position of the unmanned vehicle and a guidable borderline decreases. The unmanned vehicle travels, along a travel path having adjacent inbound/outbound lanes, in a direction opposite to a direction of a vehicle on an oncoming lane. If it is determined that the vehicle traveling along the oncoming lane is approaching the unmanned vehicle, then the target speed of the unmanned vehicle is reduced, whereby the unmanned vehicle is caused to travel at a low guiding speed.

6 Claims, 14 Drawing Sheets d1<d2
V1<V2

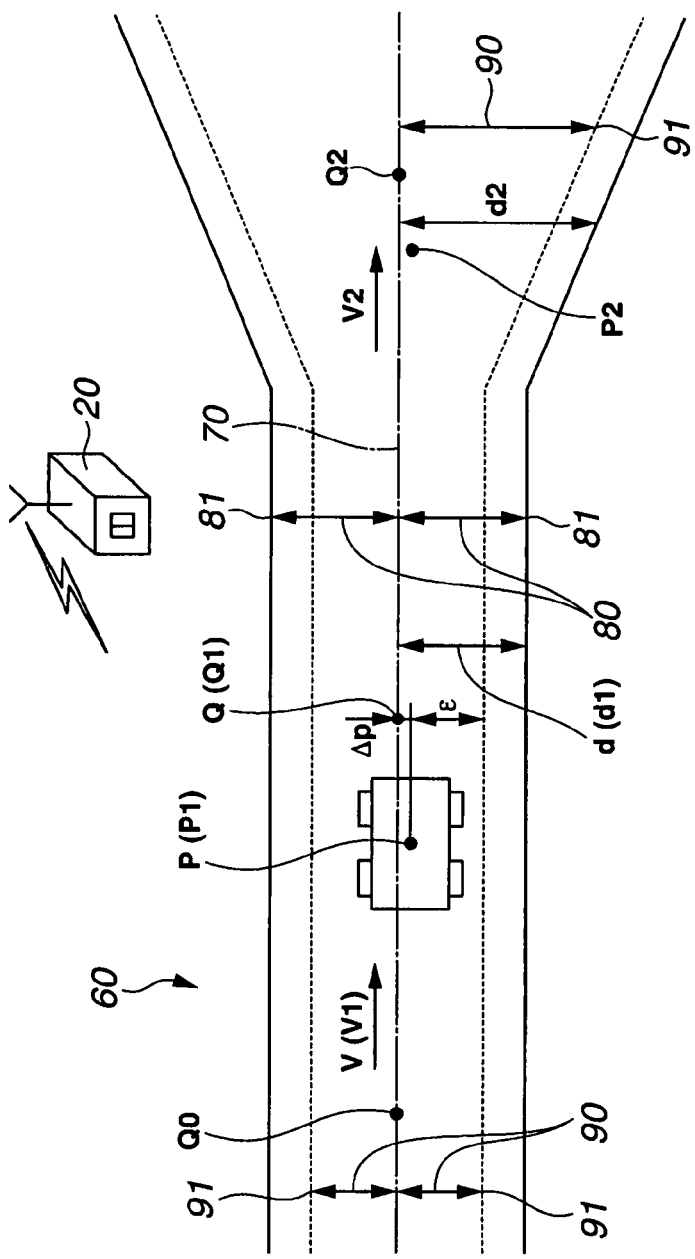
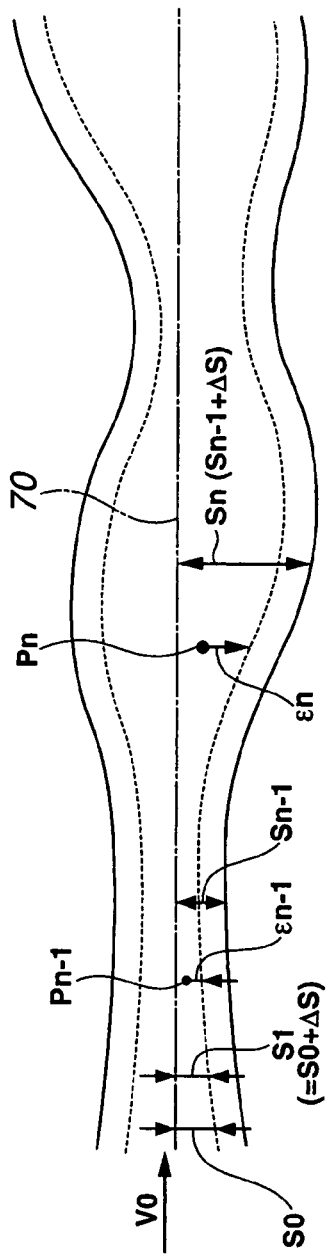
FIG.3A
FIG.3B

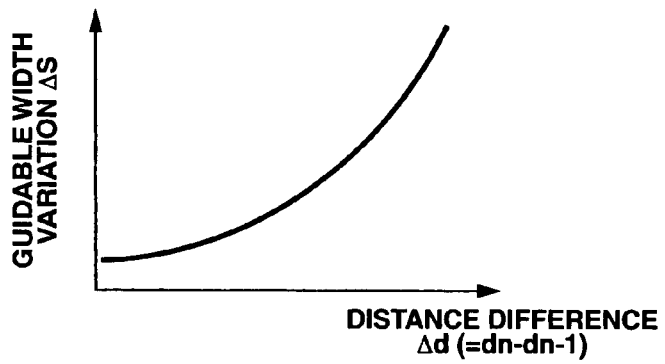
FIG.7A
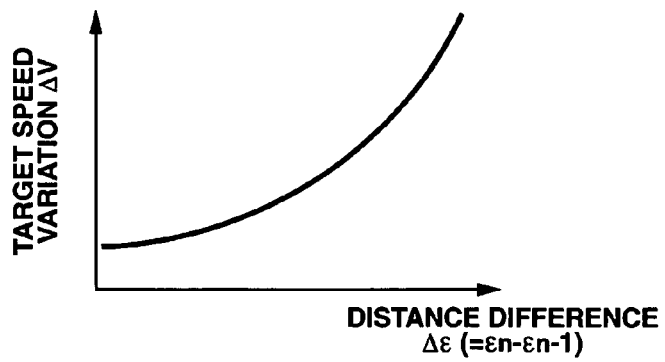
FIG.7B
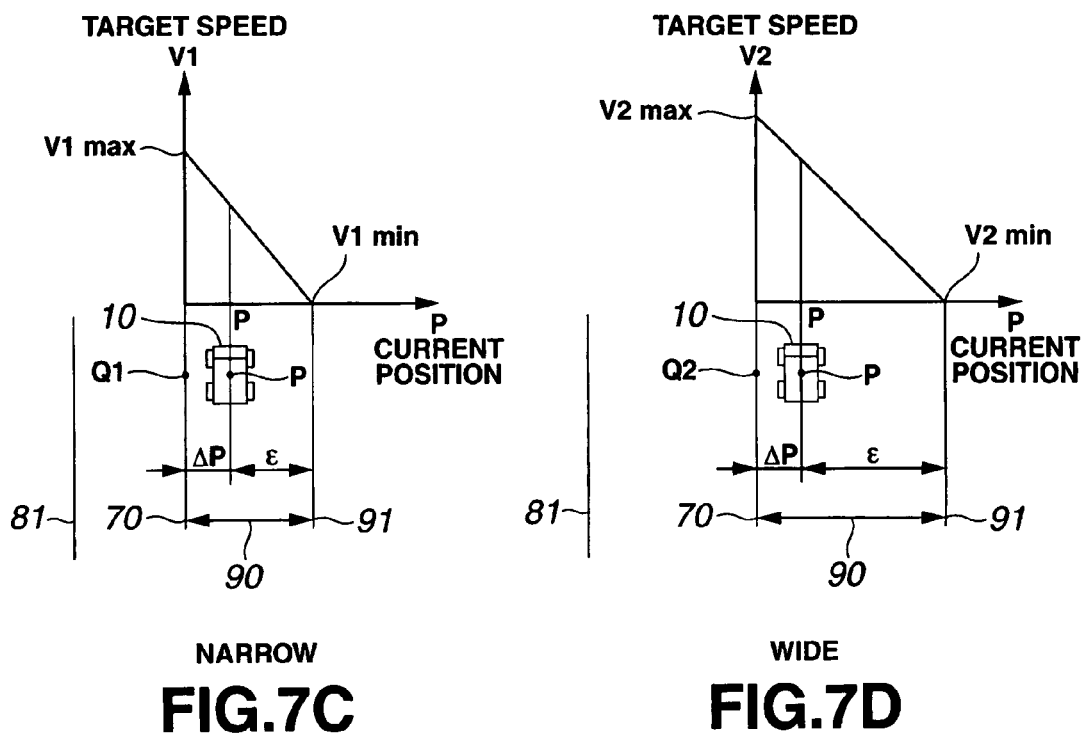
FIG.7C NARROW
FIG.7D WIDE

US 8,280,573 B2

GUIDED CONTROL DEVICE FOR UNMANNED VEHICLE

CROSS-REFERENCE TO RELATED APPLICATION

This application claims priority of Japanese Patent Application 2006-218232 filed on Aug. 10, 2006.

BACKGROUND OF THE INVENTION

1. Technical Field

The present invention relates to a guided travel control device for an unmanned vehicle, and more particularly to a device for guiding and moving an unmanned vehicle along a target travel course at a target speed without generating a guidance error between the target travel course and the current position of the unmanned vehicle.

2. Related Art

In a wide working site, such as a rock-crushing site or mine, sediment transport is carried out by driving an unmanned vehicle such as an unmanned dump truck. As shown in FIG. 1, an unmanned vehicle 10 is guided and moved along a target travel course 70 at target speed V by feeding back a guidance error $\Delta P$ between a target position Q on the target travel course 70 and the current position P of the unmanned vehicle 10 so that this guidance error $\Delta P$ becomes zero. The unmanned vehicle 10 is guided and moved by automatically controlling a steering mechanism and a traveling mechanism.

The wide working site usually has a rough landscape. A travel passage width 80 in which the unmanned vehicle 10 can travel narrows or broadens depending on the area in the wide working site. The area outside a borderline 81 of the travel passage width 80 is a shoulder, cliff, oncoming lane or the like where the unmanned vehicle 10 cannot travel.

When the unmanned vehicle 10 is subjected to guided travel control, a control error occurs, or another error occurs due to skid of the wheels. For this reason, it is inevitable that the guidance error $\Delta P$ occurs.

It is generally known that the guidance error $\Delta P$ tends to increase as the target speed V and the guiding speed of the unmanned vehicle 10 are increased. For this reason, the target speed V cannot be accelerated to a speed at which the unmanned vehicle 10 could stray from the travel passage width 80.

Therefore, conventionally, the target speed V was set based on the location where the travel passage width 80 is the narrowest on the travel path where the unmanned vehicle 10 travels. Specifically, low target speed V was set at which the unmanned vehicle 10 would not stray from the narrowest travel passage width 80.

Also, a guidable width 90 was set according to the narrowest travel passage width 80. The unmanned vehicle 10 was subjected to the guided travel control within the width of this guidable width 90.

When the guidance error $\Delta P$ between the target position Q on the target travel course 70 and the current position P of the unmanned vehicle 10 exceeds a certain level, and the unmanned vehicle 10 approaches a borderline 91 of the guidable width 90 while being guided and caused to travel within the guidable width 90, speed control is carried out such as to reduce the speed of the unmanned vehicle 10 or to stop the unmanned vehicle 10. As a result, the unmanned vehicle 10 is prevented from straying from the guidable width 90 and approaching the borderline 81 of the travel passage width 80.

There has been a demand for increasing the speed of guiding the unmanned vehicle and improving the efficiency of sediment transport in the wide working site.

SUMMARY OF THE INVENTION

The present invention has been contrived in view of such circumstances, and it is an object of the present invention to increase the guiding speed while preventing the unmanned vehicle from straying from the travel passage width, to improve the work efficiency.

According to a first aspect of the invention, as shown in FIG. 2, the larger the distance d between the current point Q on the target travel course 70 and the travelable borderline 81 representing the boundary of the travel passage width 80 in which the unmanned vehicle 10 can travel, the higher the target speed V of the unmanned vehicle 10 is set. The unmanned vehicle 10 is guided and moved along the target travel course 70 so that the set target speed V can be obtained.

Therefore, in a location where the travel passage width 80 is narrow, low target speed V1 is set and the unmanned vehicle 10 is caused to travel at the low guiding speed, thus the unmanned vehicle 10 is prevented from straying from the travel passage width 80 as in the conventional art. In a location where the travel passage width 80 is wide, high target speed V2 is set and the unmanned vehicle 10 travels at the high guiding speed. Even if the guiding speed increases in the location where the travel passage width 80 is wide, and the guidance error increases accordingly, the unmanned vehicle 10 does not stray from the travel passage width 80 because of the wide travel passage width 80. The wider the travel passage width 80, the higher the guiding speed at which the unmanned vehicle 10 can travel, whereby the work efficiency is improved as compared with the conventional art.

According to a second aspect of the invention, as shown in FIG. 3, the larger the distance d between the current point Q on the target travel course 70 and the travelable borderline 81 representing the boundary of the travel passage width 80 in which the unmanned vehicle 10 can travel, the larger the guidable width 90 is set. The target speed V is set such that the larger the guidable width 90 becomes, the higher the target speed V of the unmanned vehicle 10 becomes. The unmanned vehicle 10 is guided and moved along the target travel course 70 so that the set target speed V can be obtained.

Therefore, as with the first invention, the wider the travel passage width 80, the higher the higher the guiding speed at which the unmanned vehicle 10 can travel. Therefore, the work efficiency is improved as compared with the conventional art. Moreover, the wider the travel passage width 80 is, the wider the guidable width 90. Therefore, the width at which the unmanned vehicle 10 is subjected to guided travel control can be increased.

According to a third aspect of the invention, as shown in FIGS. 7C and 7D, the larger the distance $\epsilon$ between the current position P of the unmanned vehicle 10 and the guidable borderline 91 becomes, the higher the target speed V of the unmanned vehicle 10 becomes, and the smaller the distance $\epsilon$ between the current position P of the unmanned vehicle 10 and the guidable borderline 91 becomes, the lower the target speed V of the unmanned vehicle 10 becomes. Therefore, not only when the unmanned vehicle 10 travels without generating a guidance error, but also even when the unmanned vehicle 10 travels away from the target travel course 70, as long as the shifted amount $\Delta P$ is the same between an area where travel passage width 80 is wide and an area where the travel passage width 80 is narrow, the target speed V is set to be higher and the unmanned vehicle 10 is caused to travel at higher guiding speed when the unmanned vehicle 10 travels in the area where the travel passage width 80 is wide, than when the unmanned vehicle 10 travels in the area where the travel passage width 80 is narrow.

In this manner, the wider the travel passage width 80 (guidable width 90) becomes, the higher the target speed V is set, and the unmanned vehicle 10 is caused travel at higher guiding speed, thus the work efficiency is improved. Moreover, the more the unmanned vehicle 10 strays from the target travel course 70 to approach the borderline 91 of the guidable width 90, the lower the target speed V becomes, whereby the vehicle 10 is caused to travel at lower guiding speed, thus the vehicle 10 can be prevented from straying from the guidable width 90 and from approaching the borderline 81 of the travel passage width 80.

According to a fourth aspect of the invention, as shown in FIG. 4, the unmanned vehicle 10 travels along a travel path 60 having adjacent inbound/outbound traffic lanes 61, 62 while being in a opposite direction to a direction of a vehicle on an oncoming lane. When it is determined that a vehicle 10' traveling along the oncoming lane 62 approaches the unmanned vehicle 10, the target speed V of the unmanned vehicle 10 is reduced, whereby the unmanned vehicle 10 is caused to travel at low guiding speed. As a result, the occurrence of a risk of interference with the oncoming vehicle 10' can be prevented, and the unmanned vehicle 10 can be guided more safely.

BRIEF DESCRIPTION OF THE DRAWINGS

FIGS. 3A and 3B are views for explaining a relationship between the target travel course and a guidable width;

FIGS. 7A through 7D are views used for explaining how the embodiments relate to each another;

DETAILED DESCRIPTION OF THE INVENTION

The embodiments of the guided travel control device for an unmanned vehicle according to the present invention are described hereinafter with reference to the drawings. It should be noted in the present embodiments that a dump truck is used as an unmanned vehicle.

Figure 4:
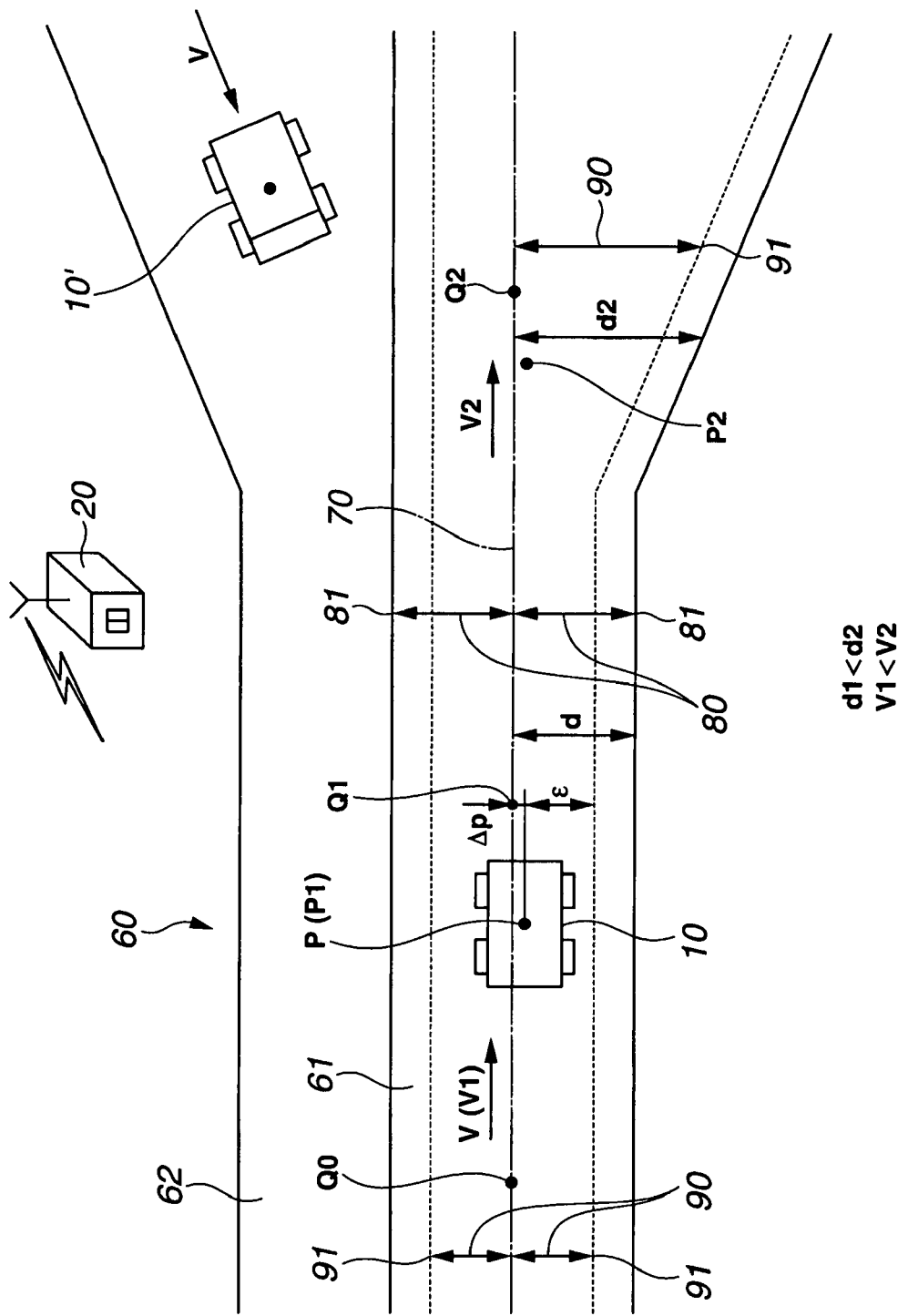
FIG. 4 is a view for explaining a travel path on which two-way traffic is operated.

FIG. 3A and FIG. 4 each show a top view of a travel path 60 along which an unmanned vehicle 10 travels.

FIG. 3A shows a situation in which the unmanned vehicle 10 travels along the travel path 60 having a single lane. FIG. 4 shows a situation in which unmanned vehicles 10, 10' travel from opposite directions towards each other along the travel path 60 having adjacent inbound/outbound traffic lanes 61, 62.

Figure 11:
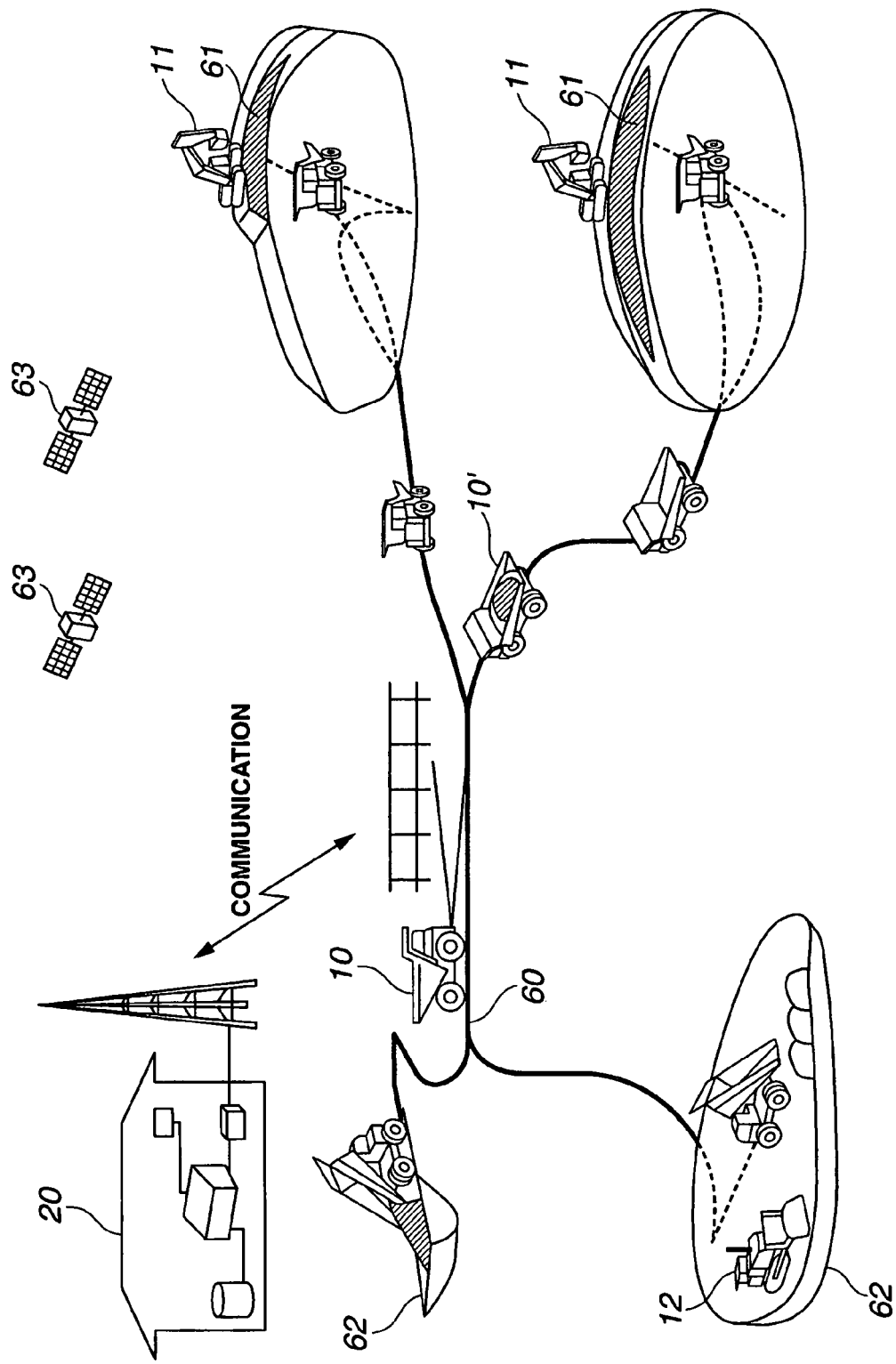
FIG. 11 is a view showing a positional relationship of each item when the controller of the embodiments is applied to a wide working site such as an unmanned rock-crushing site or mine.

FIG. 11 shows a positional relationship among each item when the controller of the embodiments is applied to a wide working site such as an unmanned rock-crushing site or mine.

In the wide working site, there are disposed a loading field 61, a soil discharging field 62, the travel path 60 connecting the loading field 61 and discharging field 62, a working vehicle 11 present in the loading field 61 and used for a loading work, a working vehicle 12 present in the soil discharging field 62 and used for a soil discharging work, a plurality of unmanned vehicles 10, 10', . . . that travel along the travel path 60, and a control station 20 that manages and monitors the plurality of unmanned vehicles 10, 10', . . . . Furthermore, a GPS (global positioning system) satellite 63 flies in the sky.

Hereinafter, the unmanned vehicle 10 out of the plurality of unmanned vehicles 10, 10', . . . is mainly described unless the plurality of unmanned vehicles 10, 10', . . . need to be described.

The unmanned vehicle 10 travels along the travel path 60 towards the soil discharging field 62 after being loaded at the loading field 61. The unmanned vehicle 10 also travels along the travel path 60 towards the loading field 61 after unloading at the soil discharging field 62.

When the unmanned vehicle 10 travels along the travel path 60, the unmanned vehicle 10 is guided and caused to travel along a target travel course 70. An operator boards the unmanned vehicle 10 when performing a teaching operation before an actual travel guidance, and then performs the teaching operation to input the target travel course 70, i.e., each target position Q on the target travel course 70. Data regarding the target travel course 70 may be acquired by measuring it, before the actual travel guidance is performed.

Before the actual travel guidance is performed on the unmanned vehicle 10, terrain data regarding the travel path 60 is acquired beforehand. The terrain data regarding the travel path 60 contains information on a survey line (borderline) of the travel path 60. The survey line of the travel path 60 is the information on a border between a travelable area and an untravelable area, such as shoulders of the travel path 60. A travel passage width 80 in which the unmanned vehicle 10 can travel, and borderlines 81 of the travel passage width 80 are obtained from the survey line information. The travel passage width 80 is the width between the target travel course 70 and either the left or right borderline 81. The outside of each borderline 81 of the travel passage width 80 is an area such as a shoulder, cliff or oncoming lane 62 where the unmanned vehicle 10 cannot travel.

The working site is provided with a control station 20 that manages and monitors the plurality of unmanned vehicles 10, 10'.

In the present embodiment, the target travel course 70 is created for each of the unmanned vehicles 10, 10' by the control station 20, and the data regarding the target travel course 70 is distributed from the control station 20 to each of the unmanned vehicles 10, 10', whereby each of the unmanned vehicles 10, 10' is guided and caused to travel along the target travel course 70.

The unmanned vehicle 10 is subjected to the guided travel control within a guidable width 90 that is set to be narrower than the travel passage width 80. The guidable width 90 is the width between the target travel course 70 and either the left or right borderline 91. The guidable width 90 is provided in order to prevent the unmanned vehicle 10 from straying from the guidable width 90 and approaching the borderline 81 of the travel passage width 80.

There are two methods of creating the guidable width 90. The first one is to use the control station 20, and the second one is to use the unmanned vehicle 10.

Figure 5:
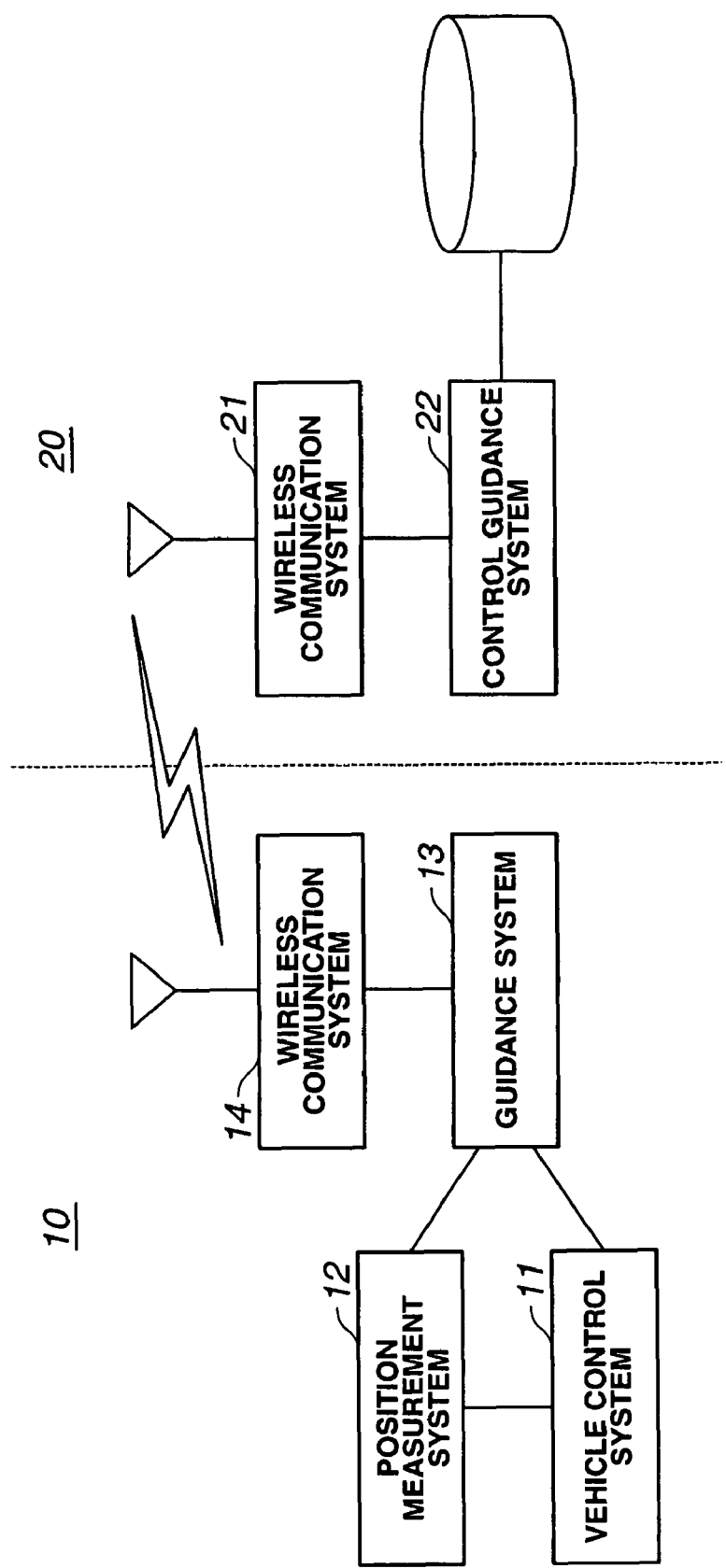
FIG. 5 is a view showing an internal configuration of the unmanned vehicle and an internal configuration of a control station.

FIG. 5 shows an internal configuration of the unmanned vehicle 10 and an internal configuration of the control station 20.

The control station 20 is provided with a wireless communication system 21 and a control guidance system 22. The unmanned vehicle 10, on the other hand, is provided with a vehicle control system 11, a position measurement system 12, a guidance system 13 and a wireless communication system 14.

Figure 12:
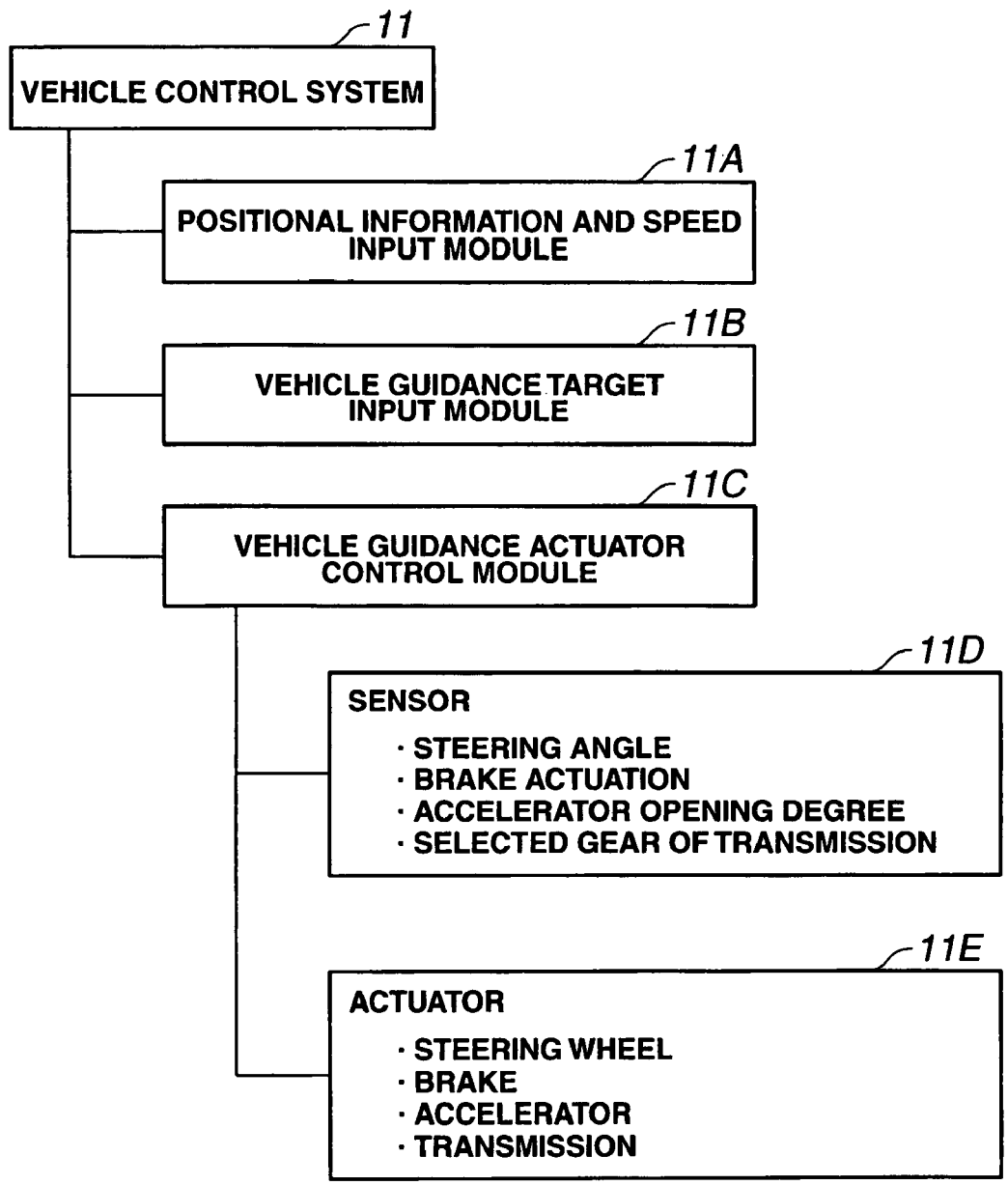
FIG. 12 is a configuration diagram of a vehicle control system.
Figure 13A:
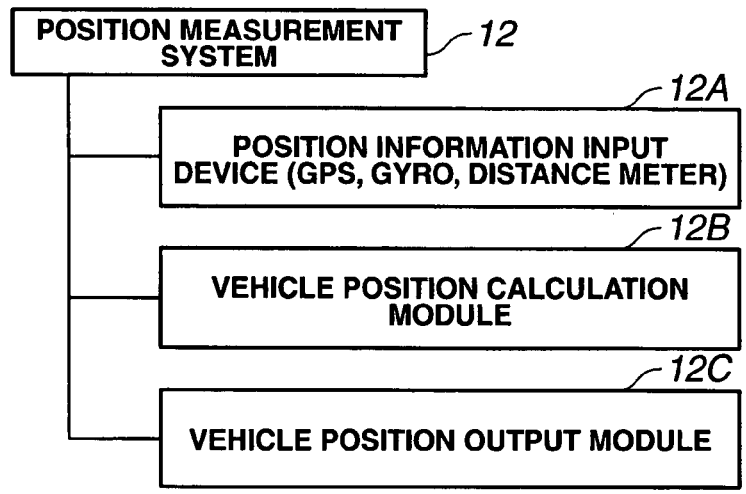
FIGS. 13A through 13C are a configuration diagram of a position measurement system, a configuration diagram of a guidance system, and a configuration diagram of a wireless communication system, respectively.
Figure 13B:
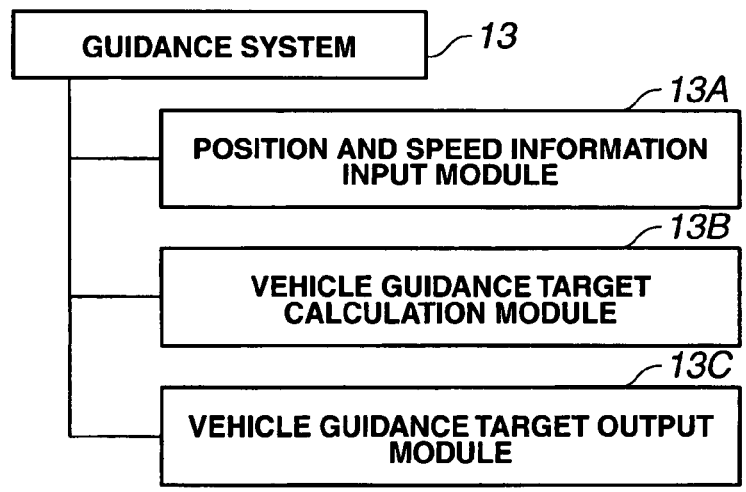
Figure 13C:
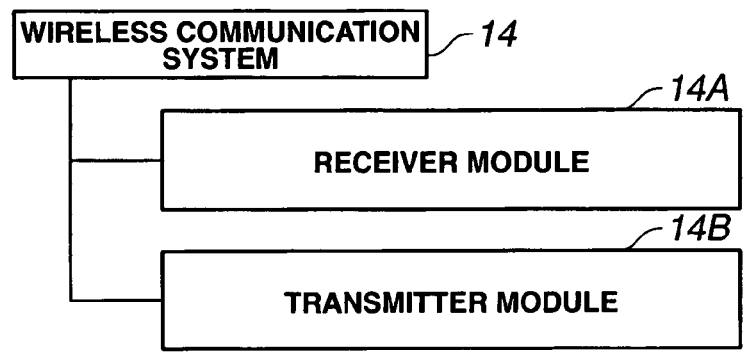

FIG. 12 is a configuration diagram of the vehicle control system 11. FIGS. 13A, 13B and 13C are a configuration diagram of the position measurement system 12, a configuration diagram of the guidance system 13, and a configuration diagram of the wireless communication system 14, respectively.

Figure 14A:
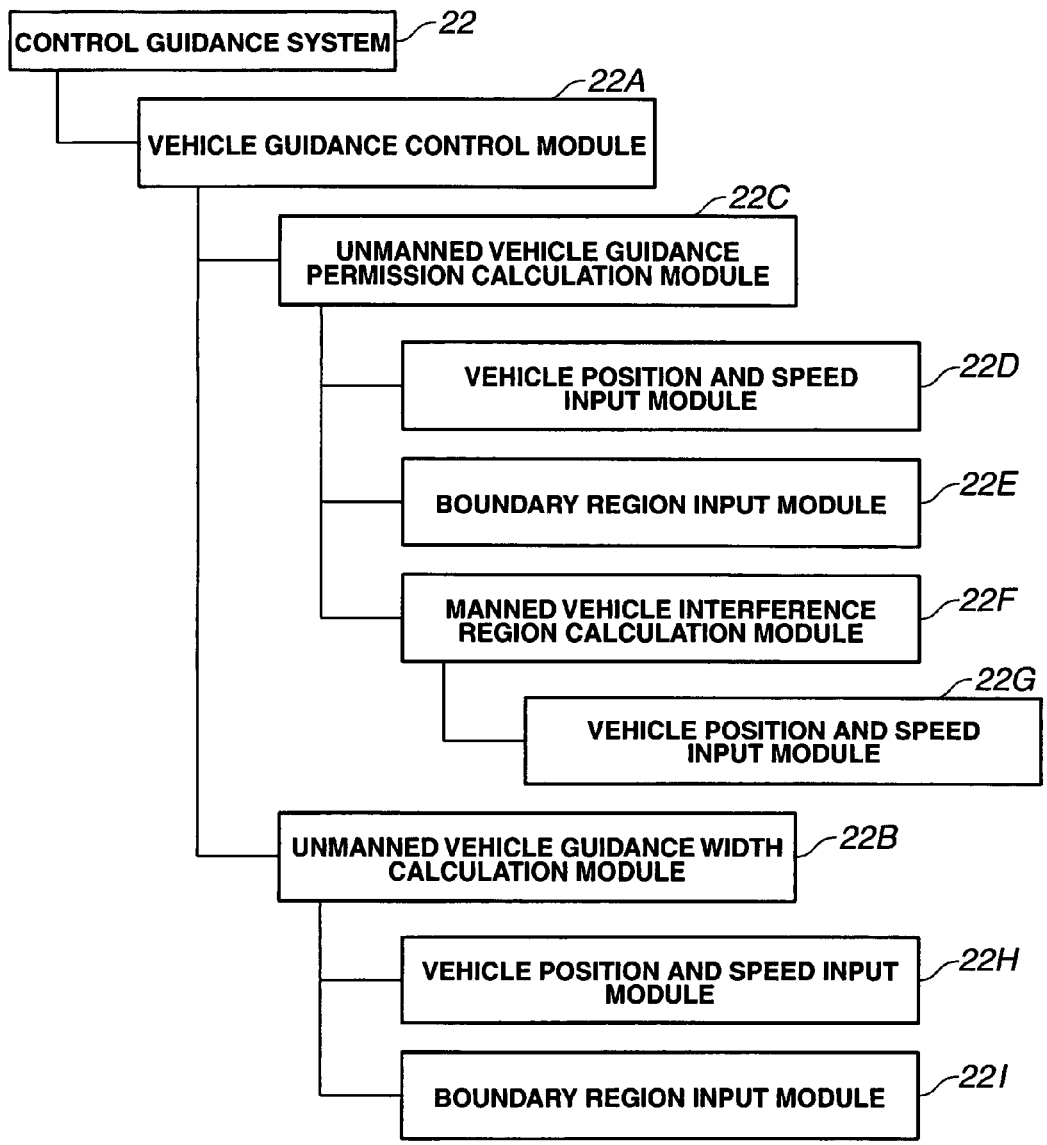
FIGS. 14A and 14B are a configuration diagram of a control guidance system and a configuration diagram of a wireless communication system, respectively.
Figure 14B:
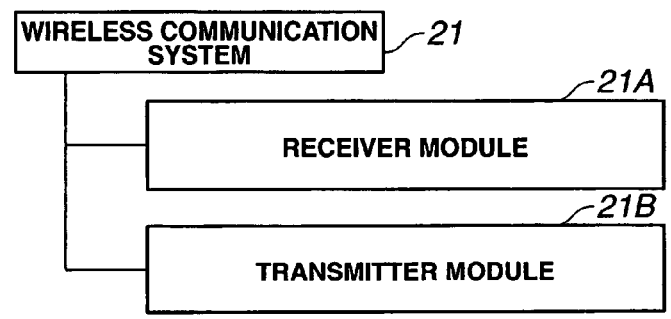

FIGS. 14A and 14B are a configuration diagram of the control guidance system 22 and a configuration diagram of the wireless communication system 21, respectively.

The other unmanned vehicle 10' has the same configuration.

In the position measurement system 12 of the unmanned vehicle 10, positional information is input by a position information input device 12A, and the current position and traveling direction of the vehicle are measured by a vehicle position measurement module 12B. The GPS, for example, is used as the means for measuring the position and traveling direction, that is, the positional information input device 12A. The position and traveling direction of the vehicle may be measured based on an output signal of a distance meter such as a tire rotation speed sensor and an output signal of a gyro. The results of measurement of the position and traveling direction of the vehicle are output from a vehicle position output module 12C.

Also, the vehicle speed of the unmanned vehicle 10 is output from the vehicle position output module 12C by performing differential processing on the position of the vehicle.

When the operator boards the unmanned vehicle 10 to cause it to travel at the time of the teaching operation, a position and speed information input module 13A of the guidance system 13 retrieves the measurement data on the position and traveling direction from the position measurement system 12 while a vehicle guidance target calculation module 13B performs a process of setting the measurement data on the position and traveling direction obtained at that moment to teaching data (position and traveling direction) of the target travel course 70. A vehicle guidance target output module 13C of the guidance system 13 performs processing of transmitting the teaching data to the wireless communication system 14. A transmitter module 14B of the wireless communication system 14 transmits the teaching data to the wireless communication system 21 of the control station 20 wirelessly.

When the unmanned vehicle 10 is guided and caused to travel along the target travel course 70, data on the position P, traveling direction and vehicle speed of the vehicle 10 that are measured by the position measurement system 12 are loaded into the position and speed information input module 13A of the guidance system 13 every predetermined period of time.

The vehicle position output module 12C of the position measurement system 12 performs processing of transmitting the successive data on the vehicle position P, traveling direction and vehicle speed of the unmanned vehicle 10 to the wireless communication system 14. The transmitter module 14B of the wireless communication system 14 transmits the successive data on the vehicle position P, traveling direction and vehicle speed to the wireless communication system 21 of the control station 20 wirelessly.

A receiver module 14A of the wireless communication system 14 receives the data regarding the target travel course 70 that is transmitted from the wireless communication system 21 of the control station 20. Also, when the guidable width 90 is created by the control station 20, the receiver module 14A of the wireless communication system 14 receives the data on the guidable width 90 that is transmitted from the wireless communication system 21 of the control station 20.

The data regarding the target travel course 70 is loaded into the vehicle guidance target calculation module 13B of the guidance system 13. When the guidable width 90 is created by the control station 20, the data on the guidable width 90 is also loaded.

When the guidable width 90 is created by the unmanned vehicle 10, the data on the guidable width 90 is created by the vehicle guidance target calculation module 13B of the guidance system 13.

The vehicle guidance target calculation module 13B of the guidance system 13 sets the target speed V on the basis of the data of the guidable width 90.

The vehicle guidance target output module 13C of the guidance system 13 outputs the data regarding the target travel course 70, data on the guidable width 90, and data on the target speed, and instructs the vehicle control system 11 to steer the vehicle 10 along the target travel course 70. Moreover, the vehicle guidance target output module 13C instructs the vehicle control system 11 to control the speed of the vehicle 10 so that the target speed V is obtained.

The data on the position P, traveling direction and vehicle speed of the vehicle 10 that are measured by the position measurement system 12 are loaded into a positional information and speed input module 11A of the vehicle control system 11 every predetermined period of time. A vehicle guidance target input module 11B of the vehicle control system 11 inputs the data regarding the target travel course 70, guidable width 90 and target speed from the vehicle guidance target output module 13C of the guidance system 13.

A vehicle guidance actuator control module 11C of the vehicle control system 11 receives from the guidance system 13 an instruction to perform steering control and speed control, and inputs the data regarding the target travel course 70, guidable width 90 and target speed. Then, on the basis of these data, current position P, current traveling direction and current vehicle speed of the vehicle 10, the vehicle guidance actuator control module 11C controls a traveling mechanism and a steering mechanism (not shown) to cause the vehicle 10 to travel along the target travel course 70 at the target speed V. Specifically, a travel command and a steer command are generated and outputted to a traveling mechanism section and a steering mechanism section respectively, while the current vehicle position P and vehicle traveling direction of the vehicle 10 that are measured by the position measurement system 12 are compared with the successive target positions Q which are passing points on the target travel course 70 and the target traveling direction, so that the vehicle 10 follows the successive passing point positions Q on the target travel course 70 without straying from the target position P and target traveling direction. Furthermore, an acceleration/deceleration command is output to the traveling mechanism section so that the guiding speed of the unmanned vehicle 10 becomes the target speed V. As a result, the unmanned vehicle 10 is guided and caused to travel along the planned travel course 70 at the target speed V. On the basis of each of sensors 11D detecting a steering angle, a brake actuation, an accelerator opening degree, a selected gear of the transmission and the like, the vehicle guidance actuator control module 11C controls the drive of each of actuators 11E actuating the steering wheel, brake, accelerator and transmission.

Once this guided travel along the target travel course 70 of this time is completed, the vehicle control system 11 reports to the guidance system 13 about such completion. When data regarding the completion of the guided travel along the current target travel course 70 is loaded into the guidance system 13, the guidance system 13 generates data regarding a course request for performing guided travel along the next target travel course. It should be noted that even in the initial state in which the unmanned vehicle 10 is powered on, a course request is generated in the same manner. The guidance system 13 performs processing of transmitting the data regarding the generated course request to the wireless communication system 14. The transmitter module 14B of the wireless communication system 14 transmits the data regarding the course request to the wireless communication system 21 of the control station 20 wirelessly. The data regarding the course request is provided with a code for identifying the vehicle (unmanned vehicles 10, 10') that sent the course request.

The control station 20 is described next.

A receiver module 21A of the wireless communication system 21 of the control station 20 receives the data transmitted from the wireless communication system 14 on the unmanned vehicle 10 side. The received data is transmitted to a control guidance system 22.

The control guidance system 22 comprises a vehicle guidance control module 22A. The vehicle guidance control module 22A is constituted mainly by an unmanned vehicle guidance permission calculation module 22C and an unmanned vehicle guidance width calculation module 22B. The unmanned vehicle guidance permission calculation module 22C is provided in order to calculate the target travel course 70 for allowing the unmanned vehicle 10 to travel therealong. The unmanned vehicle guidance width calculation module 22B is provided in order to calculate the guidable width 90 of the unmanned vehicle 10.

The data on the vehicle position P, traveling direction and vehicle speed of the unmanned vehicle 10, and the teaching data of the unmanned vehicle 10 are loaded into a vehicle position and speed input module 22D of the unmanned vehicle guidance permission calculation module 22C, and the data regarding the course request sent from the unmanned vehicle 10 is loaded into the unmanned vehicle guidance permission calculation module 22C of the control guidance system 22.

The terrain data regarding the travel path 60, i.e. the survey line information of the travel path 60, is loaded from a database into a boundary region input module 22E of the unmanned vehicle guidance permission calculation module 22C.

The data on the position and vehicle speed of a manned vehicle within the wide working site are loaded into a vehicle position and speed input module 22G of the unmanned vehicle guidance permission calculation module 22C. A manned vehicle interference region calculation module 22F of the unmanned vehicle guidance permission calculation module 22C calculates, based on the position and vehicle speed of the manned vehicle, a manned vehicle interference region in which guided travel of the unmanned vehicle 10 is not allowed. The manned vehicle interference region calculation module 22F is provided in order to prevent the unmanned vehicle 10 from interfering with the manned vehicle 10 by prohibiting the unmanned vehicle 10 from entering the manned vehicle interference region.

Once the data regarding the course request sent from the unmanned vehicle 10 is loaded into the unmanned vehicle guidance permission calculation module 22C, the target travel course 70 of this time in which the unmanned vehicle 10 that has sent the course request is allowed to be guided and moved is generated on the basis of the teaching data, the current position P, current traveling direction and current vehicle speed of the unmanned vehicle 10, and the terrain data (survey line information) on the travel path 60.

Data regarding the generated target travel course 70 is transmitted to the wireless communication system 21. The transmitter module 21B of the wireless communication system 21 transmits the data regarding the target travel course 70 to the wireless communication system 14 of the unmanned vehicle 10 which is the source of the course request.

When the guidable width 90 is created by the control station 20, the data on the vehicle position P and on the vehicle speed of the unmanned vehicle 10 are loaded into a vehicle position and speed input module 22H of the unmanned vehicle guidance width calculation module 22B. The terrain data of the travel path 60, i.e., the survey line information regarding the travel path 60, is loaded from the database into a boundary region input module 22I of the unmanned vehicle guidance width calculation module 22B.

The guidable width 90 is created by the unmanned vehicle guidance width calculation module 22B on the basis of the current position P and current vehicle speed of the unmanned vehicle 10, and on the basis of the terrain data (survey line information) on the travel path 60. The data on the guidable width 90 is transmitted to the wireless communication system 21. The transmitter module 21B of the wireless communication system 21 transmits the data on the guidable width 90 to the wireless communication system 14 of the unmanned vehicle 10.

When the guidable width 90 is created by the unmanned vehicle 10, the terrain data regarding the travel path 60 is transmitted to the wireless communication system 14 of the unmanned vehicle 10 via the wireless communication system 21.

As shown in FIG. 4, when the unmanned vehicle 10 travels along the travel path 60 constituted by the inbound/outbound traffic lanes, the information on the current position of the unmanned vehicle 10' traveling along the oncoming lane 62 is transmitted to the wireless communication system 14 of the unmanned vehicle 10 via the wireless communication system 21.

Hereinafter, each embodiment is described with reference to each flowchart.

First Embodiment

The Guidable Width 90 is Created by the Control Station 20

The present embodiment assumes a case in which the guidable width 90 is created by the control station 20.

FIG. 6 is a flowchart showing a processing procedure performed in the first embodiment.

Figures 6A, 6B:
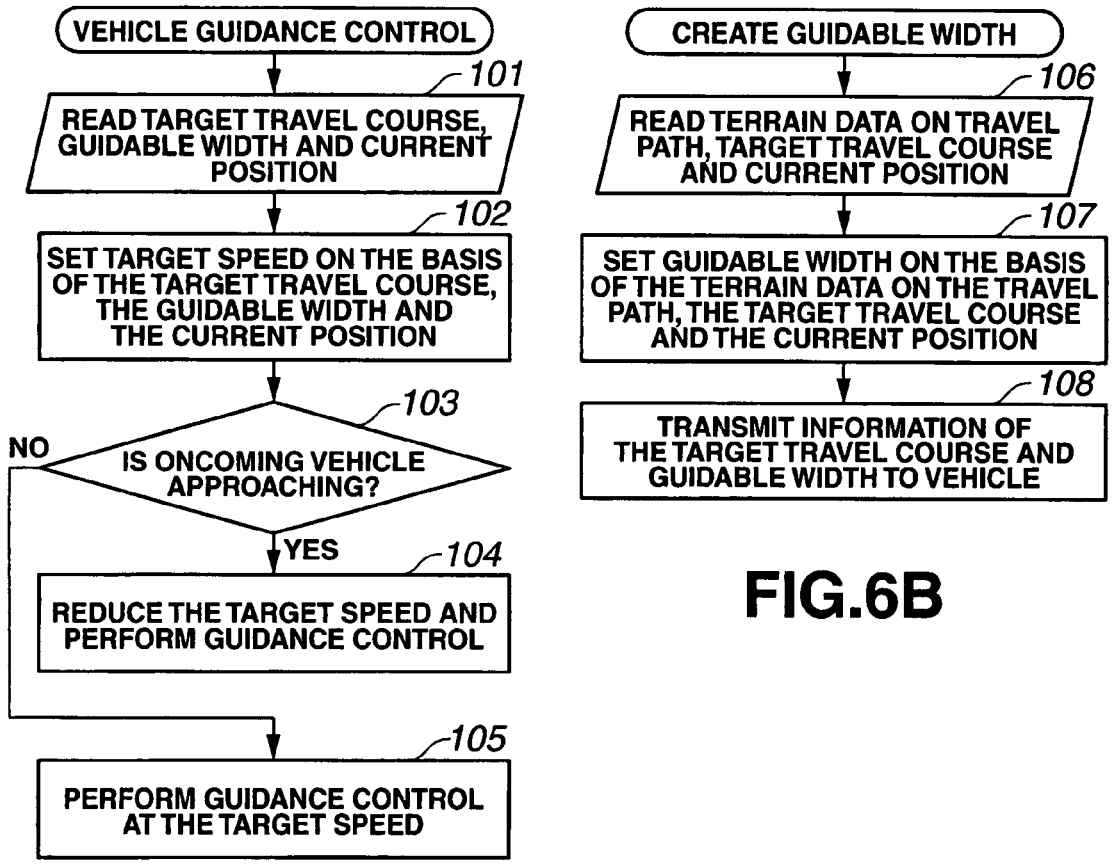
FIGS. 6A and 6B are flowcharts each showing a processing procedure performed in a first embodiment.

FIG. 6A shows processing performed by the unmanned vehicle 10, while FIG. 6B shows processing performed by the control station 20.

The control station 20 reads the current position P of the unmanned vehicle 10, the target travel course 70, and the terrain data (survey line information) on the travel path 60 (step 106).

Next, the guidable width 90 is set based on the current position P of the unmanned vehicle 10, the target travel course 70, and the terrain data (survey line information) on the travel path 60.

The control station 20 determines, based on the data on the current position P sent from the unmanned vehicle 10, which one of the target points Q on the target travel course 70 the unmanned vehicle 10 travels at. Here, as shown in FIG. 3A, the larger the distance d between the current point Q on the target travel course 70 and the travelable borderline 81, the larger the guidable width 90 is set. For example, in the case in which the current point on the target travel course 70 is Q1, the distance d1 between this point and the travelable borderline 81 is small because the travel passage width 80 is narrow. Thus, the guidable width 90 is set to be small. On the other hand, in the case in which the current point on the target travel course 70 is Q2, the travel passage width 80 is wide. For this reason, the distance d2 between this point and the travelable borderline 81 is large, thus the guidable width 90 is set to be large. The guidable width 90 is created every time when the unmanned vehicle 10 travels in a certain section of the target travel course 70 (step 107).

Figure 9:
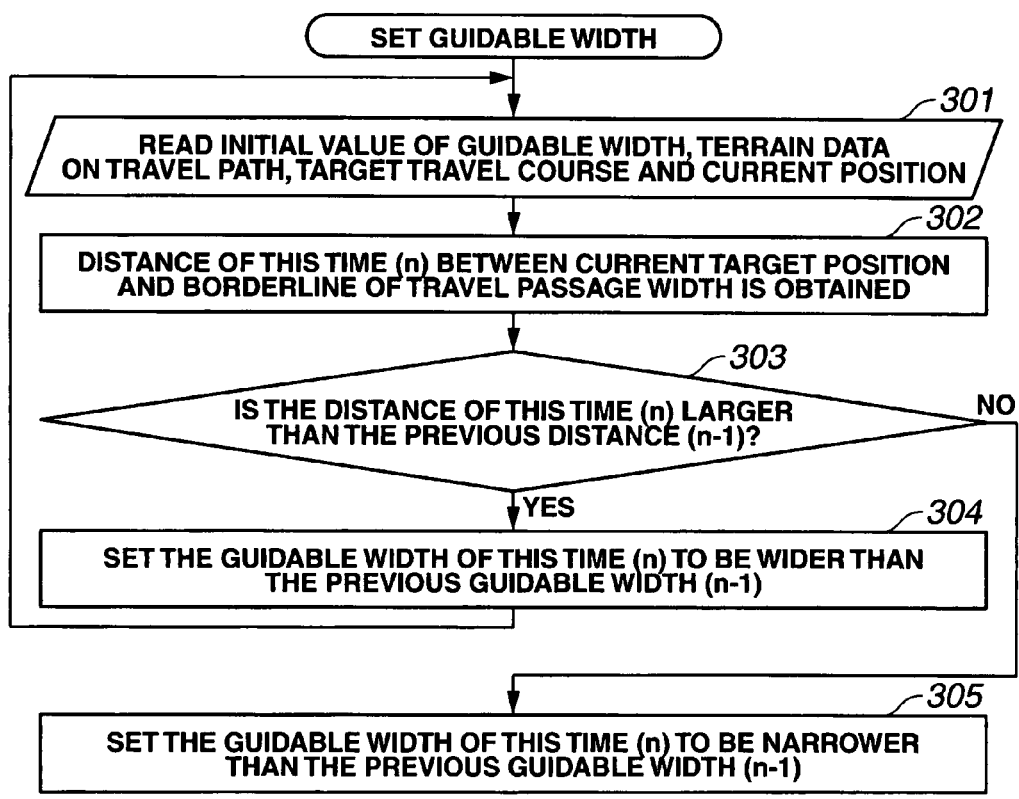
FIG. 9 is a flowchart showing a processing procedure for calculating the guidable width.

The detail of the processing of creating the guidable width 90 is shown in FIG. 9. This processing corresponds to the steps 106, 107 described above.

The current position P of the unmanned vehicle 10, the target travel course 70, and the terrain data (survey line information) on the travel path 60 are read. Also, an initial value of the guidable width 90 is stored beforehand, and this initial value of the guidable width 90 is read (step 301).

On the basis of the data on the current position P of the unmanned vehicle 10, it is determined which one of the target points Q on the target travel course 70 the unmanned vehicle 10 travels at. As shown in FIG. 3A, the current point Q on the target travel course 70 is compared with the travelable borderline 81 to obtain the distance d between the current point Q on the target travel course 70 and the travelable borderline 81. The processing of obtaining this distance d is performed every time when the unmanned vehicle 10 travels in the certain section. The distance d that is obtained this time (n) is taken as dn (step 302).

Next, the distance obtained this time, dn, is compared with the distance obtained previously, dn−1, to obtain the difference Δd, and it is determined whether the distance obtained this time, dn, is larger than the previously obtained distance dn−1. FIG. 7A shows the relationship between the distance difference Δd and a variation ΔS of the guidable width 90 (step 303).

If the distance obtained this time, dn, is larger than the previously obtained distance dn−1 (Yes in the step 303), the guidable area 90 is set such that the guidable width 90 of this time is wider than the previous guidable width 90 by the amount ΔS corresponding to the distance difference Δd. For example, as shown in FIG. 3B, when the initial value of the guidable width 90 is S0, a value S1 of the guidable width 90, which is obtained after the first time, is set to S0+ΔS, and when the value of the guidable width 90 of the previous time n−1 is Sn−1, the value of the guidable width 90 of this time n, i.e., Sn, is set to Sn−1+ΔS (step 304).

If the distance obtained this time, dn, is smaller than the previously obtained distance dn−1 (No in the step 303), the guidable width 90 is set such that the guidable width 90 of this time is narrower than the previous guidable width 90 by the amount ΔS corresponding to the distance difference Δd. For example, when the initial value of the guidable width 90 is S0, the value S1 of the guidable width 90, which is obtained after the first time, is set to S0−ΔS. When the value of the guidable width 90 of the previous time n−1 is Sn−1, the value of the guidable width 90 of this time n, i.e., Sn, is set to Sn−1−ΔS (step 305).

The information on the created guidable width 90 and regarding the target travel course 70 is transmitted from the control station 20 to the unmanned vehicle 10 (step 108).

The unmanned vehicle 10 receives the information on the guidable width 90 and regarding the target travel course 70, and reads the information on the guidable width 90 and regarding the target travel course 70. Also, the data on the current position P of the vehicle 10 is read (step 101).

Next, the target speed V of the unmanned vehicle 10 is set based on the current position P of the unmanned vehicle 10, the data regarding the target travel course 70, and on the guidable width 90. The target speed V is set such that the larger the guidable width 90 becomes, the higher the target speed V of the unmanned vehicle 10 becomes. For example, as shown in FIG. 3A or FIG. 4, in the case in which the current position P of the unmanned vehicle 10 is P1 and the point Q1 on the target travel course 70 is the target position, the guidable width 90 is set to be narrow. Therefore, the target speed V1 is set to be low in accordance with the narrow guidable width 90. On the other hand, in the case in which the current position P of the unmanned vehicle 10 is P2 and the point Q2 on the target travel course 70 is the target position, the guidable width 90 is set to be wide. Therefore, the target speed V2 is set to be high in accordance with the wide guidable width 90 (step 102).

Figure 10:
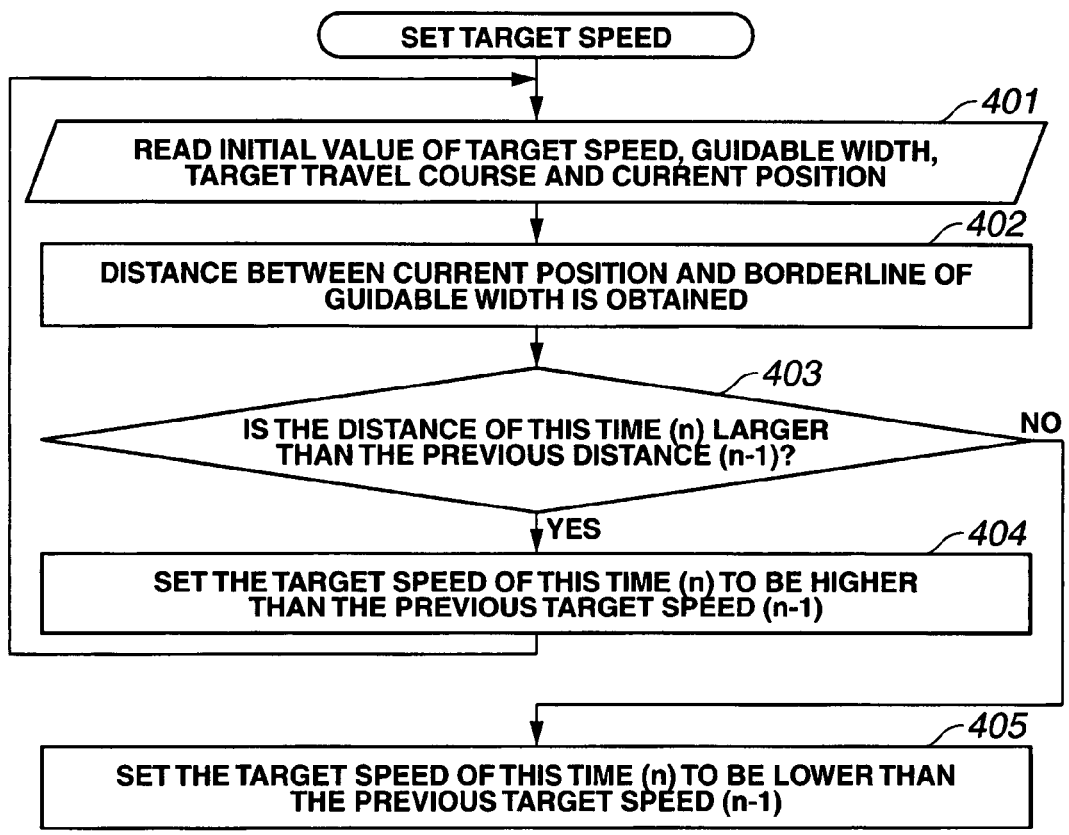
FIG. 10 is a flowchart showing a processing procedure for calculating target speed.

The detailed processing of setting the target speed V is shown in FIG. 10. This processing corresponds to the step 102 described above.

The unmanned vehicle 10 reads the current position P of the vehicle 10, the data regarding the target travel course 70, and the guidable width 90. Also, an initial value of the target speed V is stored beforehand and then read (step 401).

Next, a guidance error ΔP between the target position Q and the current position P is calculated, and the distance ε between the current position P of the unmanned vehicle 10 and the guidable borderline 91 is calculated.

The processing of obtaining the distance ε is performed every time when the unmanned vehicle 10 travels in the certain section. The distance ε that is obtained this time (n) is taken as εn (step 402).

Next, the distance εn that is obtained this time is compared with a distance obtained previously, i.e., εn−1, to obtain the difference therebetween, Δε, and it is determined whether the distance obtained this time, εn, is larger than the distance obtained previously, εn−1. FIG. 7C shows the relationship between the distance difference Δε and a variation ΔV of the target speed V (step 403).

If the distance obtained this time, ∈n, is larger than the previously obtained distance ∈n−1 (Yes in the step 403), the target speed V is set such that the target speed V of this time is higher than the previous target speed V by the amount ΔV corresponding to the distance difference Δ∈. For example, in the case in which the previous value of the target speed V is V1, the target speed V2 of this time is set to V1+ΔV (step 404).

If the distance obtained this time, ∈n, is smaller than the previously obtained distance ∈n−1 (No in the step 403), the target speed V of this time becomes lower than the previous target speed V by the amount ΔV corresponding to the distance difference Δ∈. For example, in the case in which the previous value of the target speed V is V1', target speed V2' of this time is set to V1'−ΔV (step 405).

FIG. 7C shows a state where the distribution of the magnitude of the target speed V1 that is set when the guidable width 90 is set to be narrow is associated with the current position P of the unmanned vehicle 10. If the unmanned vehicle 10 is positioned at the target point Q1 without being shifted, the distance ∈ between this position and the borderline 91 of the guidable width 90 becomes maximum, and the maximum target speed V1max is set. If the unmanned vehicle 10 is shifted from the target point Q1, the target speed V1 is gradually reduced as the guidance error ΔP, which is the shifted amount, increases, that is, as the distance ∈ between the current position P and the borderline 91 of the guidable width 90 decreases. If the amount by which the unmanned vehicle 10 is shifted from the target point Q1 becomes maximum and the distance ∈ between the current position P and the borderline 91 of the guidable width 90 becomes 0, the minimum target speed V1min is set.

FIG. 7D shows a state in which the distribution of the magnitude of the target speed V2 that is set when the guidable width 90 is set to be wide is associated with the current position P of the unmanned vehicle 10. Similarly, the target speed V changes between the maximum target speed V2max and the minimum target speed V2 min in accordance with the distance ∈ between the current position P and the borderline 91 of the guidable width 90.

As can be understood from FIGS. 7C and 7D, the target speed V of the unmanned vehicle 10 increases as the distance E between the current position P of the unmanned vehicle 10 and the guidable borderline 91 increases, and the target speed V of the unmanned vehicle 10 decreases as the distance ∈ between the current position P of the unmanned vehicle 10 and the guidable borderline 91 decreases. Comparing the wide location in the passage width 80 (guidable width 90) with the narrow location, when the unmanned vehicle 10 travels without generating a guidance error, the target speed V in the wide travel passage width 80 (guidable width 90) (FIG. 7D) is set to be higher than that in the narrow travel passage width 80 (FIG. 7C) (V2max>V1max). Even in a case where the unmanned vehicle 10 travels away from the target travel course 70, if the shifted amount ΔP is the same, then the target speed V is set to be higher when the unmanned vehicle 10 travels in the wide travel passage width 80 (guidable width 90) (FIG. 7D) than when the unmanned vehicle 10 travels in the narrow travel passage width 80 (FIG. 7C) (V2>V1).

Next, it is determined whether the unmanned vehicle 10' traveling along the oncoming lane 62 is approaching. This determination is made by comparing the information on the current position of the unmanned vehicle 10' traveling along the oncoming lane 62, the information being transmitted from the control station 20, with the information on the current position P of the vehicle 10.

It should be noted that when the wireless communication system used for a communication between the vehicles is mounted in each of the vehicle 10, 10', the positional information may be directly transmitted and received between the vehicles 10, 10' to perform the above-described comparison and determination based on the acquired positional information on the other vehicle 10' (step 103).

As a result, as shown in FIG. 4, if it is determined that the unmanned vehicle 10 traveling along the lane 61 approaches the other unmanned vehicle 10' traveling along the adjacent oncoming lane 62 (Yes in the step 103), the target speed is changed to a speed that is lower than the target speed V set in the step 102 by a prescribed amount. Then, the unmanned vehicle 10 is guided and caused to travel along the target travel course 70 so that this changed target speed V is obtained (step 104).

If it is determined that the unmanned vehicle 10 traveling on the lane 61 is not approaching the other unmanned vehicle 10' traveling on the adjacent oncoming lane 62 (No in the step 103), the unmanned vehicle 10 is guided and caused to travel along the target travel course 70 so that the target speed V set in the step 102 is obtained (step 105).

As described above, according to the present embodiment, the low target speed V1 is set and the unmanned vehicle 10 is caused to travel at the low guiding speed in the area where the travel passage width 80 is narrow, thus the unmanned vehicle 10 is prevented from straying from the travel passage width 80, as in the conventional art. In the area where the travel passage width 80 is wide, the high target speed V2 is set and the unmanned vehicle 10 travels at the high guiding speed. Even if the guiding speed increases in the area where the travel passage width 80 is wide and the guidance error ΔP increases accordingly, the unmanned vehicle 10 does not stray from the travel passage width 80. The wider the travel passage width 80, the higher the guiding speed at which the unmanned vehicle 10 can travel, whereby the work efficiency can be improved as compared with the conventional art.

Furthermore, according to the present embodiment, the wider the travel passage width 80 is, the wider the guidable width 90 is. Therefore, the width in which the unmanned vehicle 10 is subjected to the guided travel control can be increased.

Moreover, according to the present embodiment, as shown in FIGS. 7C and 7D, the target speed V of the unmanned vehicle 10 increases as the distance ∈ between the current position P of the unmanned vehicle 10 and the guidable borderline 91 increases, and the target speed V of the unmanned vehicle 10 decreases as the distance ∈ between the current position P of the unmanned vehicle 10 and the guidable borderline 91 decreases. Therefore, not only when the unmanned vehicle 10 travels without generating a guidance error, but also even when the unmanned vehicle 10 travels away from the target travel course 70, as long as the shifted amount ΔP is the same between the area where the travel passage width 80 (guidable width 90) is wide and the area where the travel passage width 80 (guidable width 90) is narrow, the target speed V is set to be higher and the unmanned vehicle 10 travels at higher guiding speed when the unmanned vehicle 10 travels in the area where the travel passage width 80 (guidable width 90) is wide, than when the unmanned vehicle 10 travels in the area where the travel passage width 80 (guidable width 90) is narrow.

In this manner, the wider the travel passage width 80 (guidable width 90) becomes, the higher the target speed V is set, and the unmanned vehicle 10 travels at higher guiding speed, thus the work efficiency is improved. In addition, the more the unmanned vehicle 10 strays from the target travel course 70 to approach the borderline 91 of the guidable width 90, the lower the target speed V becomes, whereby the unmanned vehicle 10 travels at lower guiding speed. Therefore, the unmanned vehicle 10 is prevented from straying from the guidable width 90 and approaching the borderline 81 of the travel passage width 80.

According to the present embodiment, as shown in FIG. 4, when it is determined that the vehicle 10' traveling along the oncoming lane 62 approaches the unmanned vehicle 10 when the unmanned vehicle 10 travels in the direction towards the vehicle 10', the target speed V of the unmanned vehicle 10 is reduced, whereby the unmanned vehicle 10 is caused to travel at lower guiding speed. Accordingly, the occurrence of a risk of interference with the oncoming vehicle 10' can be prevented, and the unmanned vehicle 10 can be guided more safely.

Second Embodiment

The Guidable Width 90 is Created by the Unmanned Vehicle 10

The present embodiment assumes a case in which the guidable width 90 is created by the unmanned vehicle 10.

Figure 8:
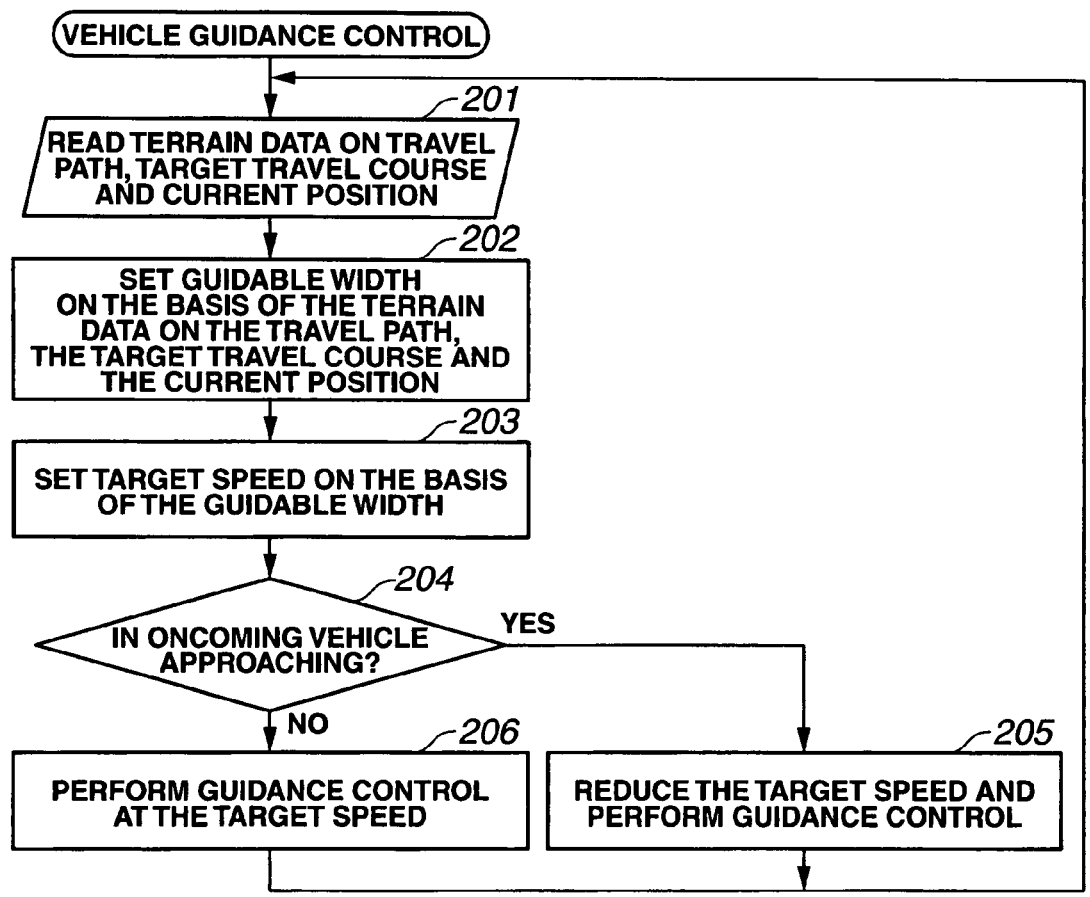
FIG. 8 is a flowchart showing a processing procedure performed in a second embodiment.

FIG. 8 is a flowchart showing a processing procedure performed in the second embodiment.

The unmanned vehicle 10 reads the current position P of the unmanned vehicle 10, the target travel course 70, and the terrain data (survey line information) on the travel path 60 (step 201).

Next, the guidable width 90 is created based on the current position P of the unmanned vehicle 10, the target travel course 70, and the terrain data (survey line information) on the travel path 60.

The unmanned vehicle 10 determines, based on the data on the current position P on this vehicle 10, which one of the target points Q on the target travel course 70 the unmanned vehicle 10 travels at. As shown in FIG. 3A, the larger the distance d between the current point Q on the target travel course 70 and the travelable borderline 81, the larger the guidable width 90 is set. For example, in the case in which the current point on the target travel course 70 is Q1, the travel passage width 80 is narrow. For this reason, the distance d1 between this point and the travelable borderline 81 is small, thus the guidable width 90 is set to be small. On the other hand, in the case in which the current point on the target travel course 70 is Q2, the travel passage width 80 is wide. For this reason, the distance d2 between this point and the travelable borderline 81 is large, thus the guidable width 90 is set to be large. The guidable width 90 is created every time when the unmanned vehicle 10 travels in a certain section of the target travel course 70 (step 202).

The processing of creating the guidable width 90 is performed in the manner shown in FIG. 9 described above. This processing corresponds to the steps 201, 202 described above.

Next, the target speed V of the unmanned vehicle 10 is set based on the guidable width 90 that is created and set as described above. The target speed V is set such that the wider the guidable width 90 the higher the target speed V of the unmanned vehicle 10. For example, as shown in FIG. 3A or FIG. 4, in the case in which the current position P of the unmanned vehicle 10 is P1 and the point Q1 on the target travel course 70 is the target position, the guidable width 90 is set to be narrow. Therefore, the low target speed V1 is set in accordance with the narrow guidable width 90. On the other hand, in the case in which the current position P of the unmanned vehicle 10 is P2 and the point Q2 on the target travel course 70 is the target position, the guidable width 90 is set to be wide. Therefore, the high target speed V2 is set in accordance with the wide guidable width 90 (step 203).

The processing of setting the target speed V is performed in the manner shown in FIG. 10 described above. This processing corresponds to the step 103 described above.

Next, it is determined whether the unmanned vehicle 10' traveling along the oncoming lane 62 is approaching. This determination is made by comparing the information on the current position of the unmanned vehicle 10' traveling along the oncoming lane 62, the information being transmitted from the control station 20, with the information on the current position P of the vehicle 10. It should be noted that when the wireless communication system used for a communication between the vehicles is mounted in each of the vehicle 10, 10', the positional information may be directly transmitted and received between the vehicles 10, 10' to perform the above-described comparison and determination based on the acquired positional information on the other vehicle 10' (step 204).

As a result, as shown in FIG. 4, if it is determined that the unmanned vehicle 10 traveling along the lane 61 approaches the other unmanned vehicle 10' traveling along the adjacent oncoming lane 62 (Yes in the step 204), the target speed is changed to a speed that is lower than the target speed V set in the step 203 by a predetermined amount. Then, the unmanned vehicle 10 is guided and caused to travel along the target travel course 70 so that this changed target speed V is obtained (step 205).

If it is determined that the unmanned vehicle 10 traveling on the lane 61 is not approaching the other unmanned vehicle 10' traveling on the adjacent oncoming lane 62 (No in the step 204), the unmanned vehicle 10 is guided and caused to travel along the target travel course 70 so that the target speed V set in the step 203 is obtained (step 206).

According to the second embodiment, the same effects as those of the first embodiment can be obtained.

Figure 1:
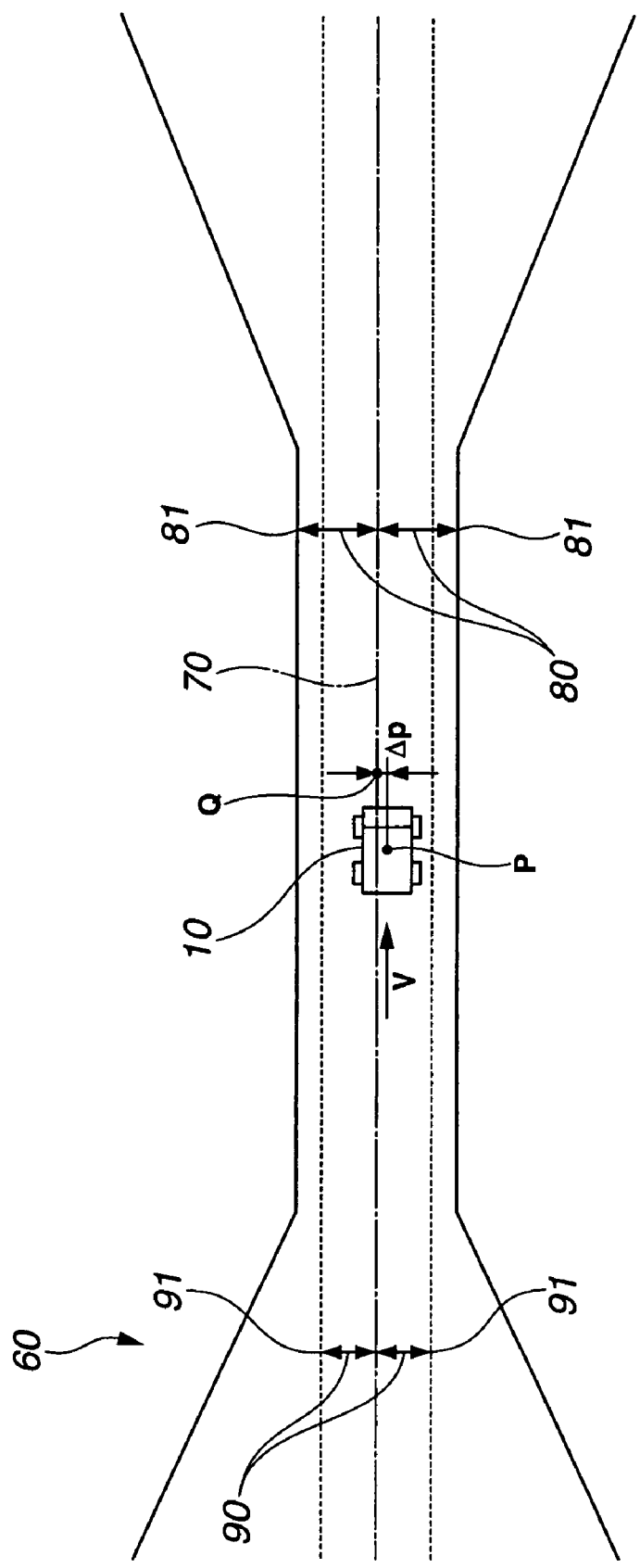
FIG. 1 is a view showing a conventional technology to explain a situation in which the travel of an unmanned vehicle is subjected to guided travel control so that the unmanned vehicle travels along a target travel course.
Figure 2:
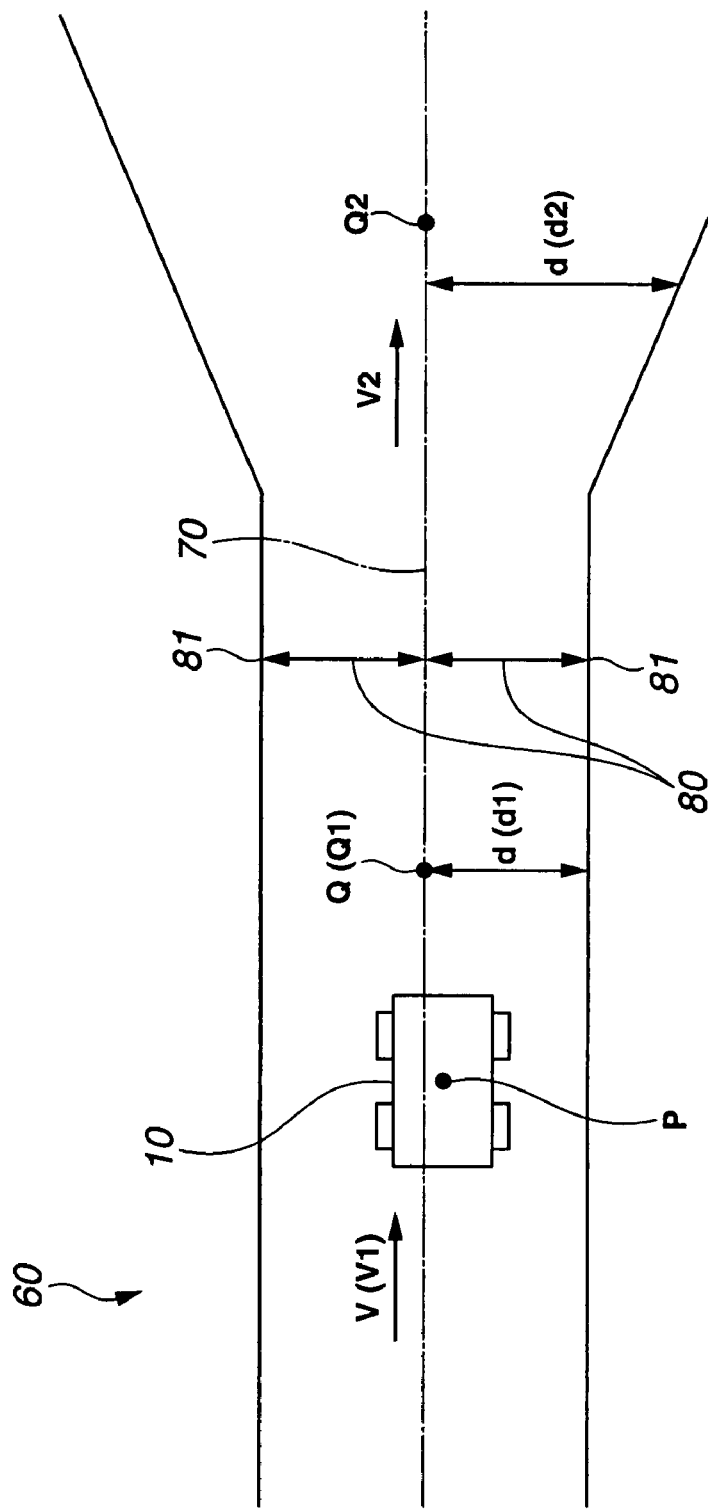
FIG. 2 is a view for explaining a relationship between the target travel course and a travel passage width.

In the embodiments described above, the target speed V is set according to the magnitude of the guidable width 90. However, if it is not necessary to provide the guidable width 90 to perform the guided travel control, the target speed V may be set according to the magnitude of the travel passage width 80 without setting the guidable width 90. Specifically, as shown in FIG. 2, the larger the distance d between the current position Q on the target travel course 70 and the travelable borderline 81 representing the boundary of the travel passage width 80, the higher the target speed V of the unmanned vehicle 10 is set. For example, when the current position P of the unmanned vehicle 10 is P1, as shown in FIG. 2, the travel passage width 80 is narrow and the distance d between the current target point Q1 and the borderline 81 is short. Therefore, the low target speed V1 is set in accordance with the narrow travel passage width 80, i.e., the short distance d1. On the other hand, when the current position P of the unmanned vehicle 10 is P2, the travel passage width 80 is wide and the distance d between the current target point Q2 and the borderline 81 is long. Therefore, the high target speed V2 is set in accordance with the wide travel passage width 80, i.e., the long distance d2.

The unmanned vehicle 10 is guided and caused to travel along the target travel course 70 so that the set target speed V can be obtained.

Therefore, low target speed V is set and the unmanned vehicle 10 is caused to travel at low guiding speed in the area where the travel passage width 80 is narrow, thus the unmanned vehicle 10 is prevented from straying from the travel passage width 80, as in the conventional art. In the area where the travel passage width 80 is wide, the target speed V is set to be high and the unmanned vehicle 10 travels at high speed. Even if the guiding speed increases in the area where the travel passage width 80 is wide and the guidance error increases accordingly, the unmanned vehicle 10 does not stray from the travel passage width 80 because the travel passage width 80 is wide. The wider the travel passage width 80, the higher the guiding speed at which the unmanned vehicle 10 can travel, thus the work efficiency improves as compared with the conventional art.

What is claimed is:

1. A guided travel control device for an unmanned vehicle, said guided travel control device comprising:
   a remote control tower for guiding and causing the unmanned vehicle to travel along a target travel course, said target travel course being line-shaped and said vehicle traveling at a vehicle speed according to a target speed with a guidance error in a width direction of the vehicle occurring according to the vehicle speed, the target travel course being set between right and left travelable borderlines which are predetermined so that the borderlines show boundaries of a travel passage width in the width direction of the unmanned vehicle, the travel passage width being a width in which the unmanned vehicle is capable of traveling to right side or left side with respect to a traveling direction of the unmanned vehicle
   target speed setting means for setting the target speed of the unmanned vehicle such that when the unmanned vehicle is guided and caused to travel along the target travel course, the target speed increases as a distance in the width direction of the unmanned vehicle between a current target point on the target travel course and the right or left travelable borderline increases, and the target speed decreases as a distance in the width direction of the unmanned vehicle between a current point of the unmanned vehicle and the right or left travelable borderline decreases; and
   guided travel control means for guiding and causing the unmanned vehicle to travel along the target travel course so that the set target speed can be obtained.

2. The guided travel control device for an unmanned vehicle according to claim 1, wherein
   the unmanned vehicle travels along a travel path having adjacent inbound/outbound lanes while facing a vehicle traveling along an oncoming lane,
   the guided travel control device further comprises determination means for determining whether the vehicle traveling along the oncoming lane approaches the unmanned vehicle, and
   the guided travel control means reduces the target speed of the unmanned vehicle when the vehicle traveling along the oncoming lane approaches the unmanned vehicle.

3. A guided travel control device for an unmanned vehicle, said guided travel control device comprising:
   a remote control tower for guiding and causing the unmanned vehicle to travel along a target travel course, said target travel course being line-shaped and said vehicle traveling at a vehicle speed according to a target speed with a guidance error in a width direction of the vehicle occurring according to the vehicle speed,
   wherein the guided travel control device has a
   guidable width setting means in said control tower for setting a guidable width to be a width narrower than a travel passage width and to be a width in which the unmanned vehicle is able to be guided and caused to travel when the unmanned vehicle is subjected to a guided travel control, the travel passage width being a width in which the unmanned vehicle is capable of traveling to right side or left side with respect to a traveling direction of the unmanned vehicle, the guidable width setting means setting the guidable width such that, when the unmanned vehicle is guided and caused to travel along the target travel course, the guidable width increases as a distance in the width direction of the unmanned vehicle between a current point of the unmanned vehicle and a right or left travelable borderline increases, the travelable borderline being predetermined so that the borderlines show boundaries of the travel passage width in the width direction of the unmanned vehicle, and the guidable width decreases as a distance in the width direction of the unmanned vehicle between the current point of the unmanned vehicle and the right or left travelable borderline decreases,
   target speed setting means for setting the target speed of the unmanned vehicle such that the target speed of the unmanned vehicle increases as the guidable width increases, and the target speed of the unmanned vehicle decreases as the guidable width decreases; and
   guided travel control means for guiding and causing the unmanned vehicle to travel along the target travel course so that the set target speed can be obtained.

4. The guided travel control device for an unmanned vehicle according to claim 3, wherein
   the target speed setting means sets the target speed of the unmanned vehicle such that the target speed of the unmanned vehicle increases as a distance between the current point of the unmanned vehicle and a right or left guidable borderline increases, and the target speed of the unmanned vehicle decreases as the distance between the current point of the unmanned vehicle and the right or left guidable borderline decreases, the right or left guidable borderline being a right or left boundary of the guidable width.

5. The guided travel control device for an unmanned vehicle according to claim 4, wherein
   the unmanned vehicle travels along a travel path having adjacent inbound/outbound lanes while facing a vehicle traveling along an oncoming lane,
   the guided travel control device further comprises determination means for determining whether the vehicle traveling along the oncoming lane approaches the unmanned vehicle, and
   the guided travel control means reduces the target speed of the unmanned vehicle when the vehicle traveling along the oncoming lane approaches the unmanned vehicle.

6. The guided travel control device for an unmanned vehicle according to claim 3, wherein
   the unmanned vehicle travels along a travel path having adjacent inbound/outbound lanes while facing a vehicle traveling along an oncoming lane,
   the guided travel control device further comprises determination means for determining whether the vehicle traveling along the oncoming lane approaches the unmanned vehicle, and
   the guided travel control means reduces the target speed of the unmanned vehicle when the vehicle traveling along the oncoming lane approaches the unmanned vehicle.

* * * * *